Figure 1:
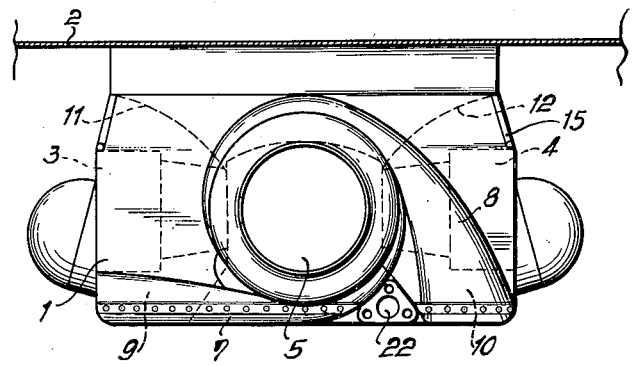

April 18, 1961  F. PORSCHE  2,980,194
AIR-COOLED INTERNAL COMBUSTION ENGINE
Filed May 29, 1959  2 Sheets-Sheet 1

INVENTOR
Ferdinand PORSCHE
BY
Dicke, Craig and Freudenberg
ATTORNEYS

April 18, 1961 F. PORSCHE 2,980,194
AIR-COOLED INTERNAL COMBUSTION ENGINE
Filed May 29, 1959 2 Sheets-Sheet 2
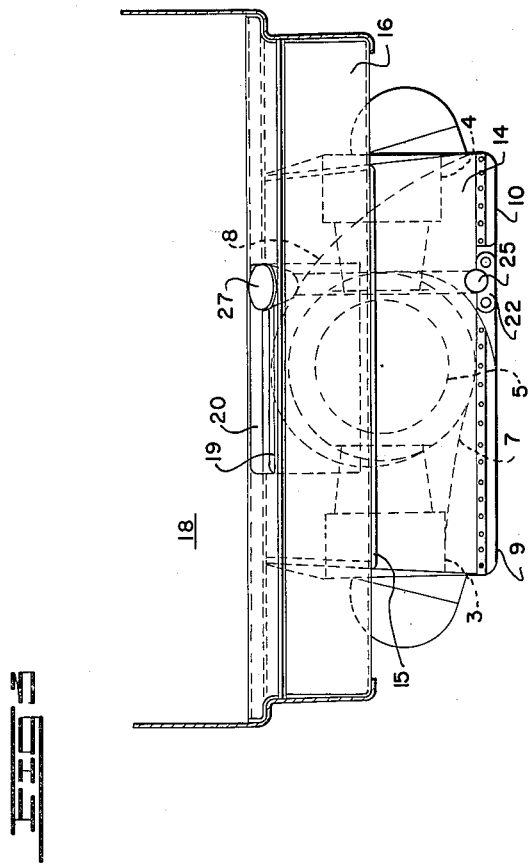
INVENTOR
FERDINAND PORSCHE
BY *Dicke, Craig & Freudenberg*
ATTORNEYS United States Patent Office 2,980,194
Patented Apr. 18, 1961

2,980,194

AIR-COOLED INTERNAL COMBUSTION ENGINE

Ferdinand Porsche, Feuerbacher Weg 48, Wurttemberg, Stuttgart, Germany

Filed May 29, 1959, Ser. No. 816,933

Claims priority, application Germany June 28, 1958

18 Claims. (Cl. 180—54)

The present invention relates to an air-cooled internal combustion engine of the boxer type, particularly for driving a motor vehicle, having opposed rows of cylinders and a cooling blower or compressor disposed coaxially with respect to the crankshaft of the engine that supplies air through scroll cases to air distributing chambers disposed underneath or below the rows of cylinders.

With internal combustion engines of the type mentioned hereinabove, difficulties are usually encountered in properly accommodating individual engine auxiliary devices. These devices must not only be readily accessible but also have to be so arranged and located as not to impair the handling and servicing of other parts of the internal combustion engine.

Particularly the accommodation of an oil filling pipe is subject to certain requirements such as, for instance, ready accessibility and servicing thereof, and shielding against the passenger space and luggage compartment; additionally, the oil filling pipe has to be located in such a position that soiling of the engine does not occur.

Especially when engines disposed below the sub-frame of a motor vehicle, none of the conventional arrangements of the oil filling pipe could be utilized since in such an arrangement the engine is entirely covered by a sheet-metal stamping or part which forms a boundary wall for the passenger space.

Accordingly, the present invention proposes to provide an oil filler pipe arranged between the blower casing and one of the scroll casings thereof and to connect the oil filler pipe to the wall of the crank case which is located adjacent the blower casing. With such an arrangement, it is possible to place the oil filler pipe in a favorable position at one of the end faces of the internal combustion engine. Furthermore, such an arrangement obviates the need for special openings or recesses in the body of the automobile through which oil vapor may possibly pass into the passenger space or compartment. For this purpose, the crank case is extended within the region of the oil sump by a sleeve or the like preferably removably connected with the crank case wall which is led through the blower casing and one of the scroll casings. This sleeve extends up to in front of the blower and is provided at its free end with an oil filler pipe.

In connection with an air-cooled internal combustion engine which is covered up over the entire length and width thereof by a plate forming a part of the sub-frame of the motor vehicle, preferably the floor of the luggage compartment, and in which all the cooling air is conducted to the blower intake through ducts or guide channels provided in the sub-frame of the vehicle, the oil filler pipe in accordance with the present invention extending inside of these air intake guide ducts or channels. As a result of the disposition of the oil filler pipe within the intake air channel, an accumulation of oil vapor escaping therefrom is prevented because the vapor is continuously sucked away by the cooling air stream. At the same time, no additional space is required in the vehicle with such an arrangement for accommodating this oil filler pipe.

Furthermore, the oil filler pipe located within the air intake guide channels does not in any way obstruct or impair the accessibility of the engine. With an internal combustion engine in which the air guide channel is formed at the end thereof away from the engine by a double-walled luggage compartment cover or closure member, the oil filler pipe is extended essentially to the separating joint or gap between the luggage compartment cover and the vehicle sub-frame. Such an arrangement makes possible to expose the oil filler pipe already upon opening the luggage compartment cover, without the danger of soiling the luggage compartment. Since oil checks or replenishing of the engine oil occur rather frequently, servicing of the vehicle, especially insofar as accessibility is concerned, is considerably facilitated, and may be undertaken without the need for special arrangements, such as freeing or emptying the luggage compartment. The oil-check for the engine is thereby also considerably simplified.

Accordingly, it is an object of the present invention to provide an air-cooled internal combustion engine with an oil filler pipe which is easily accessible without requiring special openings in the vehicle body.

A further object of the present invention is to locate the oil filler pipe of an air-cooled internal combustion engine in such a way that oil vapors escaping therefrom are prevented from entering the passenger compartment.

Still another object of the present invention lies therein to locate the oil filler pipe of an internal combustion engine in such a manner that oil vapors escaping therefrom are continuously sucked away by the cooling air blower.

A still further object of the present invention resides in the provision of an oil filler pipe for an air-cooled internal combustion engine which is arranged in such a way as not to obstruct the accessibility to the engine.

Figure 2:
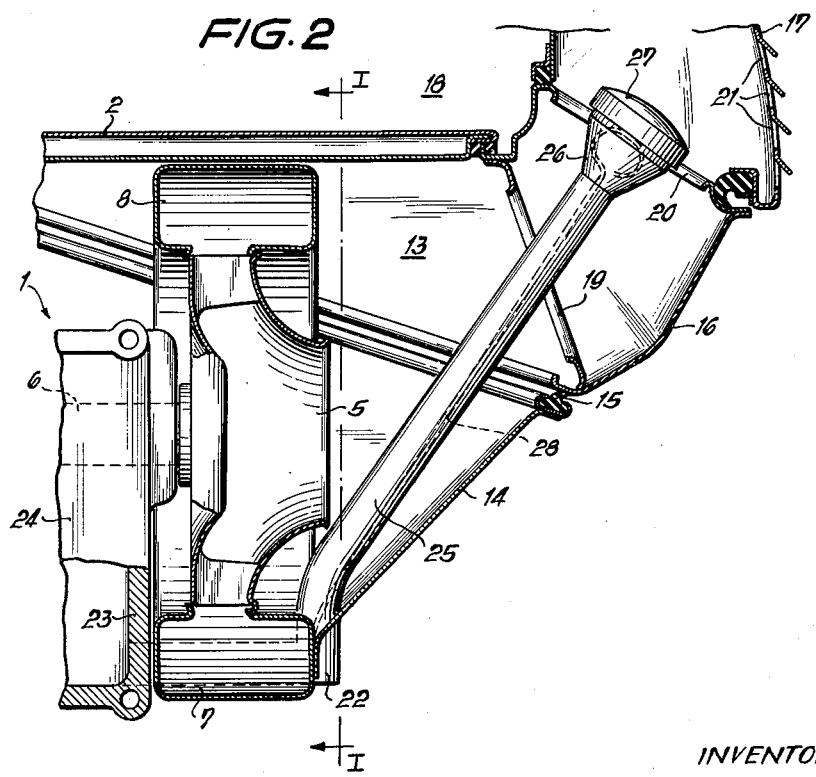

These and other objects, features and advantages of the present invention will become more obvious from the following description when taken in connection with the accompanying drawing which shows, for purposes of illustration only, one preferred embodiment in accordance with the present invention, and wherein:

Figure 1 is an end elevational view of an air-cooled internal combustion engine in accordance with the present invention viewed in the direction toward the blower and installed in a passenger motor vehicle and provided with a cooling air blower arranged coaxially with the engine crankshaft, Figure 2 is a partial longitudinal cross-sectional view through the engine and surrounding vehicle body parts of Figure 1 taken along section line I—I, and Figure 3 is an end view of the internal combustion engine in accordance with the present invention viewed in the direction toward the blower and with the trunk lid of the vehicle omitted.

Referring now to the drawing wherein like reference numerals are used throughout the various views to designate like parts, reference numeral 1 designates the internal combustion engine which is disposed in the rear of a passenger motor vehicle (not shown) and below a floor plate 2 which simultaneously forms the floor of the luggage compartment of the motor vehicle.

The internal combustion engine is provided with oppositely disposed cylinders 3 and 4 which are cooled by means of cooling air. The cooling air is supplied from a cooling blower 5 which is arranged coaxially with respect to the crankshaft 6 of the internal combustion engine and which is driven thereby either directly or over a set of gears. The cooling blower 5 is located to the rear of the engine when viewed in the direction of vehicle travel and thereby is disposed near the rear end of the vehicle.

The cooling blower 5 is constructed as a radial or centrifugal blower and supplies the cooling air through scroll casings 7 and 8 to air distributing chambers 9 and 10 that are disposed below the cylinders 3 and 4. The cooling air passes along the cylinder walls in a vertical upward direction from a point below to a point above the cylinders and is then directed to the atmosphere by means of deflector plates 11 and 12, arranged above the cylinders 3 and 4.

The cooling air is conducted to the blower 5 through an intake air-guide channel 13 (Figure 2) which is formed by a plurality of stampings or pressed sheet-metal parts including a pocket-shaped stamped or pressed sheet-metal part 14 connected to the blower 5 or to scroll casings 7 and 8 thereof. The sheet-metal part 14 is supported, by means of a sealing strip 15, at a box-shaped transverse bearer member 16 of the vehicle sub-frame. A cover or lid 17 adjoins the transverse bearer member 16 on the side thereof away from the engine by means which the luggage compartment 18, disposed above the floor plate 2, is readily accessible from the outside. It is thereby advantageous to construct the floor plate 2 so as to be removable from the vehicle sub-frame to permit accessibility also to certain engine parts.

The transverse bearer member 16 is provided with openings or apertures 19 and 20. The lid 17 is also provided with a plurality of openings or slots 21 in order that the cooling air may be conducted to the blower 5 through slots 21, openings 20 and 19 as well as through the pocket-shaped sheet-metal part 14.

A tube or sleeve 22 is attached between the scroll casings 7 and 8, that is, between the scroll casing 8 and the housing or casing of the blower 5 to the wall portion 23 of the engine crank case 24 which is not covered within this region and is disposed adjacent to the blower 5. The sleeve 22 is made of such length that it extends rearwardly beyond the blower 5 as seen in the side view of Figure 2. An oil filler pipe 25 is attached to the free rear end of the sleeve 22 which pipe 25 extends on the inside of the intake air guide channel 13 up to the separating joint between the transverse bearer member 16 and the cover or lid 17. The oil filler tube 25 and the filler funnel 26 are exposed as soon as the lid 17 is opened so that after removal of cap 27 from the filler funnel 26, oil may be poured into the filler pipe 25 and therewith into the engine crank case 24. For measuring the oil level, a measuring gauge 28 is provided in the oil filler tube 25.

The position of the oil filler pipe 25 in accordance with the present invention not only assures a clean filling operation but the accessibility to the filler pipe 25 is thereby extraordinarily favorable. The air, which passes along the filler pipe 25 to the blower 5 continuously sucks the oil vapors away so that they are not able to reach the passenger compartment. Furthermore, the accessibility to the engine and the auxiliary aggregates thereof is in no way impaired or obstructed by the disposition of the filler pipe 25 in accordance with the present invention. Figure 3 illustrates the relative position of the various elements of the present invention. This figure is an end view of the air-cooled internal combustion engine in accordance with the present invention viewed in the direction toward the blower and installed in a passanger motor vehicle, the trunk lid 17 of which has been omitted for the sake of clarity. This view illustrates the placement of the oil filler pipe 25 with relation to the openings 19 and 20 and the blower 5 and scroll casings 7 and 8.

While I have shown and described one specific embodiment in accordance with the present invention, it is understood that the same is not limited thereto but is susceptible of many changes and modifications within the spirit of the present invention, and I, therefore, do not wish to be limited to the specific details described and shown herein but intend to cover all such changes and modifications as defined by the scope of the appended claims.

I claim:

1. An air-cooled internal combustion engine provided with a crankshaft, particularly for driving a motor vehicle, comprising a crank case and at least one row of cylinders arranged to one side thereof, cooling air distributing chamber means disposed below said row of cylinders to conduct cooling air to said cylinders, air blower means arranged coaxially with respect to said crankshaft including a blower casing and a scroll casing for supplying cooling air to said chamber means, oil filler pipe means operatively connected to a wall portion of said crank case adjacent said blower means and extending between said blower casing and said scroll casing.

2. An air-cooled internal combustion engine of the boxer type having a crankshaft, particularly for driving a motor vehicle, comprising crank case means and opposed rows of cylinders attached thereto, air distributing chamber means below each of said rows of cylinders, air blower means arranged coaxially with respect to said crankshaft including a blower casing and scroll casings for supplying cooling air to said chamber means, air intake duct means for supplying air to said blower means, and oil filler pipe means connected to a wall portion of said crank case means adjacent said blower means and extending between said blower casing and one of said scroll casings.

3. An air-cooled internal combustion engine according to claim 2, wherein said oil filler pipe means includes a sleeve portion forming an extension of said crank case means within the region of the oil sump thereof and extending therefrom between said blower casing and one of said scroll casings.

4. An air-cooled internal combustion engine according to claim 3, wherein said sleeve portion is detachably connected to said crank case means.

5. An air-cooled internal combustion engine according to claim 3, wherein said sleeve portion extends beyond the outer end face of said blower means and is provided with a filler pipe at the free end thereof, said filler pipe being located within said air intake duct means.

6. An air-cooled internal combustion engine provided with a crankshaft, patricularly for driving a motor vehicle having a sub-frame, comprising a crank case and opposed rows of cylinders attached thereto, air distributing chamber means provided below each of said rows of cylinders, air blower means arranged coaxially with respect to said crankshaft including a blower casing and scroll casings for supplying cooling air to said chamber means, oil filler pipe means connected to a wall of said crank case adjacent said blower means and etxending between said blower casing and one of said scroll casings, air intake duct means in said sub-frame for guiding cooling air to said blower means, and cover means for covering said engine over the entire width and length thereof and forming a part of said vehicle sub-frame, said oil filler means being disposed within said air intake duct means.

7. An air-cooled internal combustion engine according to claim 6, wherein said cover means simultaneously forms the floor for the luggage compartment of said vehicle.

8. An air-cooled internal combustion engine according to claim 6, wherein said vehicle includes a luggage compartment having removable closure means seated upon said sub-frame when in the closed position, said closure means constituting a portion of said air intake duct means in the part thereof farthest from said engine, and wherein said oil filler means extends essentially to the surface of said sub-frame upon which said closure means rests when in the closed position.

9. An air-cooled internal combustion engine according to claim 8, wherein said closure means is formed by a double-wall lid enclosing therebetween a section of said air intake duct means.

10. An air-cooled internal combustion engine provided with a crank shaft, particularly for driving a motor vehicle having a superstructure, comprising a crank case including an oil sump means and opposed rows of cylinders attached thereto, cooling-air distributing chamber means provided below each of said rows of cylinders, air blower means arranged coaxially with respect to said crank shaft and driven by said crank shaft, said air blower means including a blower, a blower casing and a scroll casing for connecting said blower casing and said cooling-air distributing chamber means for supplying cooling air to said cooling-air distributing chamber means, air intake duct means for supplying cooling air to said blower means, and cover means extending over said engine for covering said engine, and oil filler pipe means connected to the wall of said crank case adjacent said blower means and extending between said blower casing and one of said scroll casings, said oil filler pipe means being disposed within said air intake duct means.

11. An air-cooled internal combustion engine according to claim 10, wherein said cover means for said engine is a load-carrying platform, and wherein said air intake duct means is formed in part by said vehicle superstructure.

12. An air-cooled internal combustion engine according to claim 11, wherein said vehicle includes a luggage compartment and said load-carrying platform is the floor of said luggage compartment, and wherein said superstructure includes a sub-frame and said air intake duct means is formed in part by said sub-frame.

13. An air-cooled internal combustion engine according to claim 10, wherein said oil filler pipe means includes a sleeve portion forming an extension of said crank case within the region of the oil sump means thereof, said sleeve portion extending beyond the outer end face of said blower means and between said blower casing and one of said scroll casings, and a filler pipe connected to the free end of said sleeve portion and extending within said air intake duct means essentially to the free end thereof.

14. An air-cooled internal combustion engine provided with a crank shaft and a cover means extending thereover, particularly for driving a motor vehicle, comprising a crank case including an oil sump means and at least one row of cylinders arranged to one side of said crank case, cooling-air distributing chamber means disposed below said row of cylinders to conduct cooling air to said cylinders, air blower means arranged coaxially with respect to said crank shaft and driven by said crank shaft, said air blower means including a blower, a blower casing and a scroll casing connecting said blower casing and said cooling-air distributing chamber means for supplying cooling air to said cooling-air distributing chamber means, air intake duct means extending upwardly and to the side of said cover means and connecting said air blower means with the atmosphere for supplying cooling air to said air blower means, and oil filler pipe means operatively connected to a wall portion of said crank case means adjacent said air blower means and said oil sump means, said oil filler pipe means extending between said blower casing and said scroll casing.

15. An air-cooled internal combustion engine according to claim 14, wherein said oil filler pipe means includes a sleeve portion forming an extension of said crank case within the region of said oil sump, said sleeve portion extending beyond the outer end of said air blower means and between said blower casing and said scroll casing, and a filler pipe attached to the free end of said sleeve portion and extending outwardly and to the side of said cover means within said air intake duct means essentially to the free end of said duct means.

16. An air-cooled internal combustion engine according to claim 15, wherein said cover means includes a sub-frame and said cover means simultaneously forms a load-carrying platform, and wherein said air intake duct means is formed in part by said sub-frame.

17. An air-cooled internal combustion engine according to claim 16, wherein said motor vehicle includes a luggage compartment and a sub-frame and wherein said load-carrying platform in the floor of said luggage compartment and said sub-frame of said cover means is the sub-frame of said motor vehicle.

18. An air-cooled internal combustion engine according to claim 17, wherein said luggage compartment has a closure means constituting a portion of said air intake duct means in the part thereof away from said engine and wherein said filler pipe extends essentially to the separating gap between the closure means and said sub-frame.

References Cited in the file of this patent

UNITED STATES PATENTS

| | | |
|---|---|---|
| 2,194,394 | Klavik | Mar. 19, 1940 |
| 2,285,119 | Klavik | June 2, 1942 |
| 2,302,298 | Cox | Nov. 17, 1942 |
| 2,424,416 | Piry | July 22, 1947 |